United States Patent [19]
Abramov et al.

[11] Patent Number: 6,097,862
[45] Date of Patent: Aug. 1, 2000

[54] OPTICAL FIBER GRATING DEVICES WITH ENHANCED SENSITIVITY CLADDING FOR RECONFIGURABILITY

[75] Inventors: Anatoli A. Abramov, Highland Park; Benjamin John Eggleton, Summit; Rolando Patricio Espindola, Morris, all of N.J.; Arturo Hale, New York, N.Y.

[73] Assignee: Lucent Technologies Inc., Murray Hill, N.J.

[21] Appl. No.: 09/151,794

[22] Filed: Sep. 11, 1998

[51] Int. Cl.[7] .................................................. G02B 6/34
[52] U.S. Cl. ............................... 385/37; 385/12; 385/31; 385/141; 359/130
[58] Field of Search .................................. 385/37, 12, 31, 385/14, 49, 123, 127, 128, 141; 359/115, 124, 130

[56] References Cited

U.S. PATENT DOCUMENTS 5,987,200  11/1999  Fleming et al. ........................ 385/37

*Primary Examiner*—Phan T. H. Palmer
*Attorney, Agent, or Firm*—Mathews, Collins, Shepherd & Gould, P.A.

[57] ABSTRACT

In accordance with the invention, a reconfigurable optical fiber grating comprises an optical fiber grating with a temperature sensitive material surrounding the cladding region or incorporated into the cladding region. One or more heating elements are arranged to produce a a temperature gradient along the length of the grating and thereby chirp the grating. In a preferred embodiment, a long period fiber grating is surrounded by a material in which dn/dT is 10 times as large as that of glass and in which n is close to but lower than that of the glass. A temperature gradient along the length of the grating results in a broadening of the resonance.

7 Claims, 3 Drawing Sheets

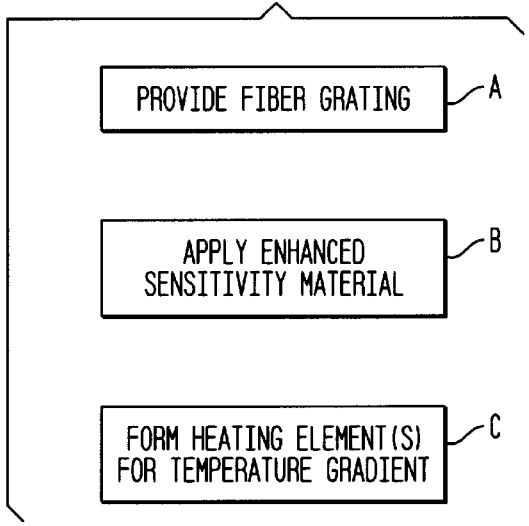
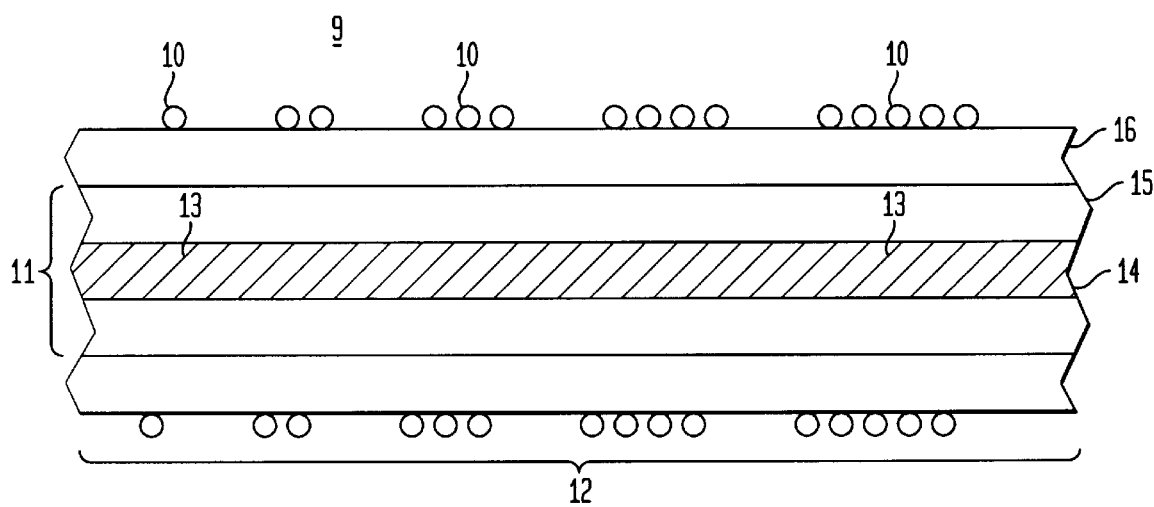

OPTICAL FIBER GRATING DEVICES WITH ENHANCED SENSITIVITY CLADDING FOR RECONFIGURABILITY

FIELD OF THE INVENTION

The present invention relates to reconfigurable optical gratings and to systems using them. In particular it concerns optical fiber gratings clad with enhanced sensitivity materials for reconfigurability.

BACKGROUND OF THE INVENTION

Waveguide gratings are conventionally fabricated by doping a waveguide core with one or more photosensitive dopants. Upon illumination with the appropriate wavelength light, typically ultraviolet, a permanent refractive index increase is produced in the core. The appropriate periodic spacing of perturbation to achieve a conventional grating can be obtained by the use of a phase mask or an amplitude mask.

Long period fiber gratings devices provide wavelength dependent loss and can be used for spectral shaping. The grating provides coupling between two copropagating modes of the waveguide with very low back reflection. Long period fiber gratings typically have periods which are at least 10 times larger than the transmitted wavelength, i.e.: $\Lambda > 10\lambda$ and are usually in the range of 15–1500 filters light in a narrow bandwidth centered around the peak wavelength of coupling, $\lambda_p$, determined by:

$$\lambda_p = (n_{01} - n_{lm})\Lambda,$$

where $n_{01}$ and $n_{lm}$ are the effective indices of the fundamental and cladding modes, respectively. Typical bandwidths are in the range of 2–50 nm. The value of $n_{01}$ is dependent on the core and cladding refractive indices, while $n_{lm}$ is dependent on core, cladding and ambient indices.

An important application of long period gratings is to flatten the gain spectrum of an erbium-doped fiber amplifier. Flattening is achieved by cascading one or more gratings to give the desired spectral response. Alternatively flattening can be achieved by chirping the grating period $\Lambda$.

Under certain circumstances the effective gain spectrum of an amplifier can vary in time due to a combination of effects. In particular, as the number of channels passing through the amplifier changes, the amplifier exhibits deleterious peaks in its gain spectrum requiring modification of the long period grating used to flatten the amplifier. In this case a reconfigurable grating would be desirable. Unfortunately conventional gratings are essentially permanent and generally not reconfigurable. Thus there is a need for gratings which can be controllably reconfigured in bandwidth.

It is known that heating a grating causes a shift in the resonant wavelength. For a typical long period fiber grating, the shift is of order 5 nm for a 100° C. temperature change. A similar effect can be achieved in a Bragg grating whereby a 100° C. temperature gives rise to a 1 nm shift. It has also been recognized that a temperature gradient along the length of a Bragg grating will broaden the bandwidth of the spectrum. Such a "chirped" Bragg grating can serve as a dispersion compensator. However, because temperatures typically must be kept well below 500° C. to avoid detrimental effects on the glass, the largest shift obtained is about 5 nm.

For many applications, such as gain flattening, the amount of broadening obtainable by heating is insufficient as it would not cover the erbium gain bandwidth of approximately 40 nm. And as larger bandwidths are employed, additional broadening will be required. Thus there remains a need for optical grating devices with reconfigurable bandwidths.

SUMMARY OF THE INVENTION

In accordance with the invention, a reconfigurable optical fiber grating comprises an optical fiber grating with a temperature sensitive material surrounding the cladding region or incorporated into the cladding region. One or more heating elements are arranged to produce a temperature gradient along the length of the grating and thereby chirp the grating. In a preferred embodiment, a long period fiber grating is surrounded by a material in which dn/dT is 10 times as large as that of glass and in which n is close to but lower than that of the glass. A temperature gradient along the length of the grating results in a broadening of the resonance.

BRIEF DESCRIPTION OF THE DRAWINGS

The nature, advantages and various additional features of the invention will appear more fully upon consideration of the illustrative embodiments now to be described in detail in connection with the accompanying drawings. In the drawings:

FIG. 1 is a block diagram of the steps involved in making a reconfigurable grating;

FIG. 2 is a schematic cross section of an optical grating device in accordance with the invention.

Figure 3:
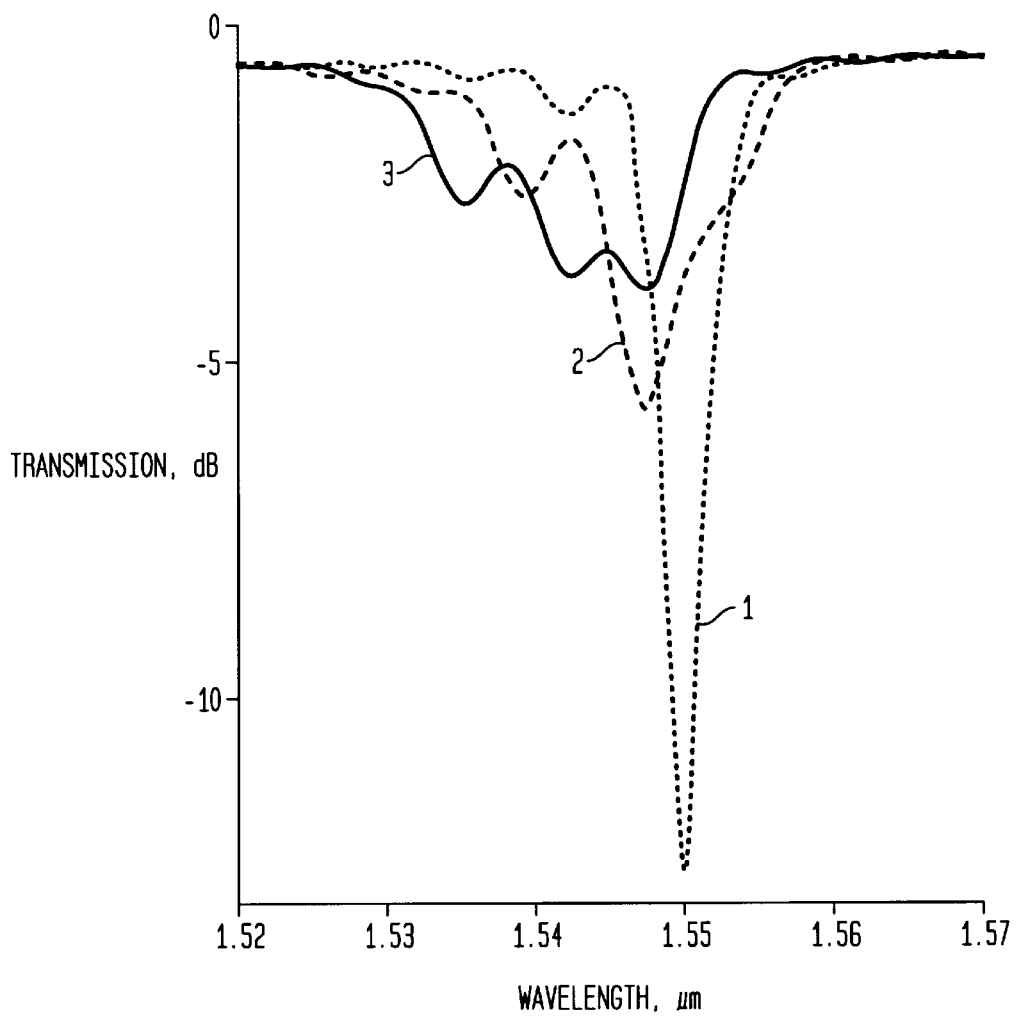
FIG. 3 is a graphical illustration of the transmission spectrum of a typical device in accordance with FIG. 2.

It is to be understood that these drawings are for purposes of illustrating the concepts of the invention and, except for the graph, are not to scale.

DETAILED DESCRIPTION

Referring to the drawings, FIG. 1 is a schematic block diagram showing the steps in making a reconfigurable optical fiber grating in accordance with the invention. As shown in block A, the first step is to provide a length of optical fiber including a grating. The fiber can be single mode or multimode optical fiber. The grating is preferably a conventional long period grating.

The second step, shown in block B, is to apply to the outer surface of the fiber (over the outer surface of the fiber cladding or within the cladding) a material having an index of refraction with enhanced sensitivity to temperature as compared to the fiber cladding material. In a preferred embodiment the index n of the temperature sensitive material is approximately the same as the cladding at ambient temperature but the change of n with T (dn/dT) is at least 10 times that of the cladding.

The next step, block C, is to form along the grating, a heating element or a sequence of small heating elements appropriate for establishing a temperature gradient in the temperature-sensitive layer. The heating elements can be in the form of a sequence of electrically resistive helical coils 20 about the coated fiber as shown in FIG. 2. The spacings between successive coils (edge-to-edge separations) are typically in the range between 1 mm and 200 nanometers and preferably 500 micrometers to 100 nanometers. The spacings can be chirped to establish a temperature gradient. Alternatively, the elements can be uniformly spaced but their effective heating capacity (e.g. the number of coils) can be varied to establish the desired gradient.

Such heating elements are preferably formed on the fiber by the microprinting technique described in U.S. patent application Ser. No. 08/677,309 filed Jul. 9, 1996 now U.S. Pat. No. 5,900,160 by H. Biebuyck et al and entitled "Microcontact Printing on Surfaces and Derivative Articles", U.S. patent application Ser. No. 08/616,929 filed Mar. 15, 1996 by R. J. Jackman et al and entitled "Method of Forming Articles and Patterning Surfaces Via Capillary Micromolding" abandonment Mar. 31, 1998, and U.S. patent application Ser. No. 08/681,235 entitled "Fabrication of Small Scale Coils and Bands . . . " filed by Rogers et al., Jul. 22, 1996 now U.S. Pat. No. 5,951,881. All three of these applications are incorporated herein by reference.

Alternatively, the heating element can comprise a single heat source and a heating sink longitudinally spaced apart on opposite ends of the grating for establishing a temperature gradient between them along the grating.

FIG. 2 schematically illustrates an exemplary optical device 9 made by the process of FIG. 1. The device 9 comprises a length of optical fiber 11 including an optical grating 12 comprising a sequence of index perturbations 13 and a plurality of heating elements 10 along the grating. The fiber 11 typically comprises a central core 14, an outer cladding 15 and an outer coating 16 of temperature sensitive material. The heating elements are of resistive metal to modify the grating by local heating.

In operation an electrical signal applied to the heating elements establishes a temperature gradient in the coating along the grating which, in turn, varies the refractive index in the coating. This variation effectively chirps the grating.

The following presents applicants' best understanding of the theory underlying the operation of this device. By differentiating $\lambda_p = (n_{01} - n_{lm})\Lambda$ with respect to temperature (T) one obtains the temperature dependence of the peak wavelength:

$$\frac{d\lambda_p}{dT} = \Lambda\left(\frac{dn_{01}}{dT} - \frac{dn_{1m}}{dT}\right) + (n_{01} - n_{lm})\left(\frac{d\Lambda}{dT}\right), \qquad (1)$$

where $d\Lambda/dT$ is governed by the thermal expansion coefficient of the material. The region surrounding the cladding contains some of the power of $LP_{1m}$. mode and both $n_{1m}$ and $dn_{lm}/dT$ ($dn_{lm}/\delta n \times \delta n/\delta T$) are predominately controlled by the material properties of this region, namely, by n and $\delta n/\delta T$, where n is the refractive index of the surrounding region. To obtain a large change in peak wavelength with respect to temperature (large $d\lambda_p/dT$), one needs to use materials such that the right hand side of Eq. (1) is large. By changing the material properties of the region surrounding the cladding or even the materials incorporated into the cladding, the temperature dependence of the grating can be enhanced. Thus by utilizing a material in which $\delta n/\delta T$ is much larger than that of glass, say ten times as large, one can effectively enhance the temperature sensitivity of the grating. In addition, the temperature sensitivity of the grating is higher when the refractive index of the material n is close to the refractive index of the glass. Having high temperature sensitive grating one can thus change the transmission spectrum of the grating. In particular, one can make a grating broader by applying a temperature gradient along the grating.

A variety of polymers meet $n_p$ and $dn_p/dT$ criteria herein described. Exemplary such, polymers include fluorinated polymers such as fluoroacrylates and fluoromethacrylates and their copolymers with hydrocarbon-based acrylates (and/or methacrylates), fluorinated urethanes, and silicon-based polymers (e.g., siloxanes). In the case of fluorine-containing polymers, the refractive index is adjusted by changing the relative fluorine content in the polymer molecule. In the case of siloxanes, the refractive index is adjusted by changing the ratio of methyl to phenyl groups attached to the siloxane chain.

The nature and method for making such devices may be more clearly understood by consideration of the following example.

EXAMPLE

This example, is a long-period grating written in a conventional dispersion-shifted fiber that will give a high $d\lambda_p/dT$. The fiber is commercially available, has a core diameter of 8.5 $\mu$m, a cladding diameter of 125 $\mu$m, a core $\Delta$ of approximately 1% (10 mole % germanium in the core) and is single-mode at 1550 nm. The desired effect is achieved using a polymer coating material with a high negative $dn_p/dT$. The refractive index of the polymer $n_p$ should be close to but not higher than the index of the glass cladding in order to permit propagation of cladding modes. The specific composition of the polymer was the following: 21.2 parts by weight of dodecafluoreheptyl acrylate, 70 parts of 2 (ethoxy-2-ethoxy)ethyl acrylate, 7.9 parts of tetraethyleneglycol diacrylate and 0.9 parts of Darocur 1173 photoinitiator. This composition is a low viscosity liquid that cures into a rubbery film upon UV irradiation. The refractive index of $n_p$ of this film was approximately 1.454 (measured at 23° C. and at the wavelength 633 nm) and $dn_p/dt$ was estimated to be approximately $-4.3 \times 10^{-4}/°$ C. A long-period grating having a length of approximately 50 mm and $\Lambda = 220 \mu$m was recoated with this polymer. The temperature gradient in the range of 20–80° C. applied along the length of the grating resulted in a broadening of the resonance peak by a factor of three.

FIG. 3 is a graphical plot showing the transmission spectrum of the grating recoated by the polymer for uniform (curve 1) heating and the changes of the transmission spectrum for two different nonuniform heatings, when temperature gradients along the grating length are applied (curves 2, 3).

Figure 4:
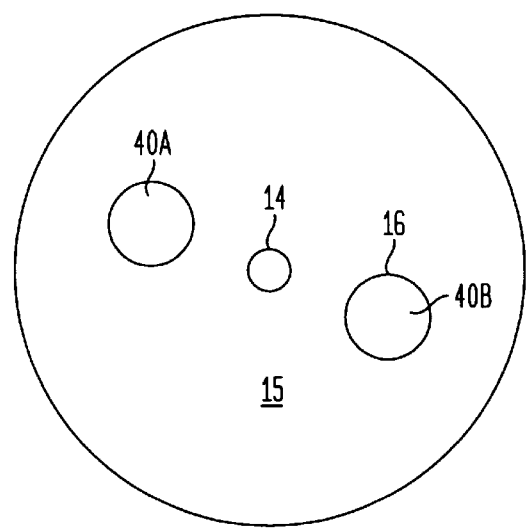
FIG. 4 schematically illustrates an alternative form of a grating device in accordance with the invention.

FIG. 4 schematically illustrates an alternative form of the device wherein the temperature sensitive material 16 is disposed within the outer cladding 15 in longitudinally extending holes 40A and 40B. Typical dimensions for the fiber are a 4 micrometer diameter core ($\Delta n = 0.03$) surrounded by a 100 micrometer OD silica cladding. The holes 40A and 40B can be 15 micrometer holes centered 25 micrometers from the core.

The temperature sensitive material can be one of the polymers described in connection with FIG. 1 and the heating elements can be the same.

Figure 5:
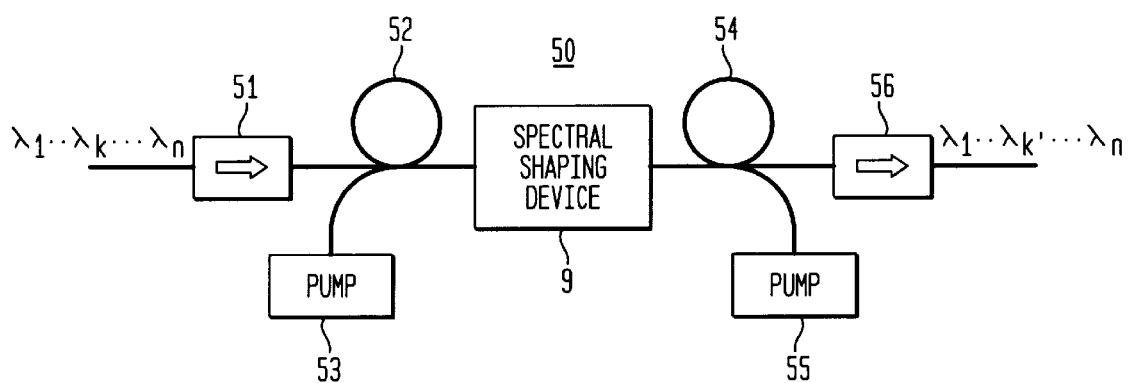
FIG. 5 shows an optical amplifier using a grating device with enhanced cladding sensitive for gain flattening.

FIG. 5 shows a dynamic gain-flattened optical fiber amplifier 50 utilizing at least one fiber grating device 9 with enhanced cladding sensitivity to operate as a spectral shaping device. The optical amplifier consist of an input isolator 51, a first length of rare-earth doped fiber 52 (such as erbium-doped fiber), an optical pump for optical pumping the first length of rare-earth fiber 53, a second length of rare-earth doped fiber 54, a second pump 55 for optical pumping the second length of rare-earth fiber, an output isolator 56, and at least one fiber grating device 9 with enhanced cladding sensitivity.

Figure 6:
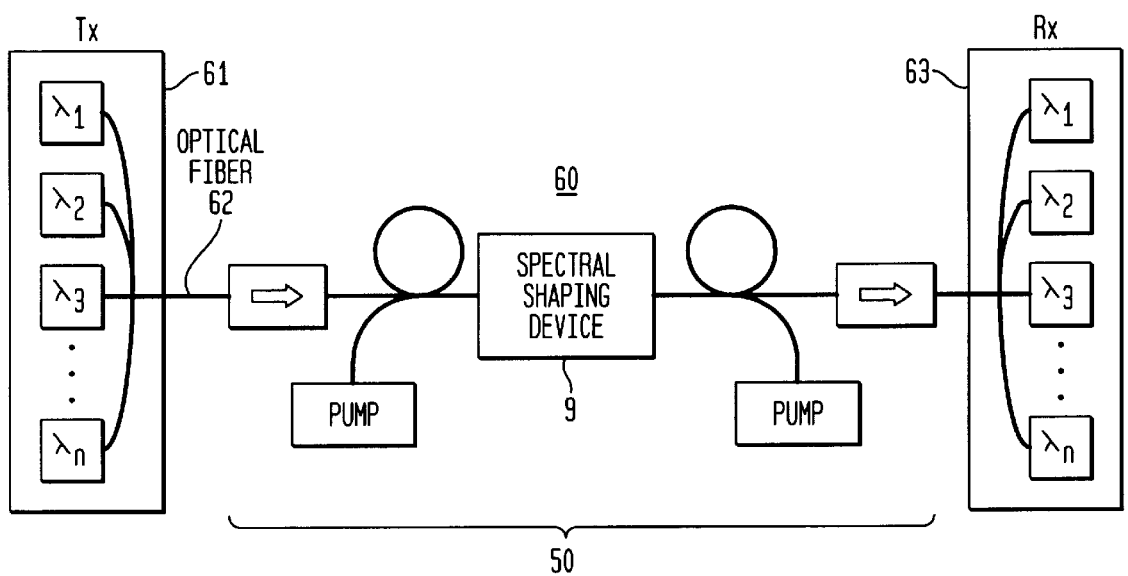
FIG. 6 shows an optical communications system employing the FIG. 5 amplifier.

FIG. 6 shows an optical fiber communications system 60 with a gain-flattened optical amplifier 50 as shown in FIG. 5. The systems comprises a multiwavelength transmitter 61, a length of optical fiber 62, a gain-flattened optical amplifier 50 using the inventive device 9 and a multiwavelength optical receiver 63.

The ability to dynamically adjust a filter shape is important, especially in DWDM fiber optical systems, because the spectral gain of the amplifier (like that of erbium doped amplifier) can change due to the number of channels present or the power level of the channels. By adjusting the filter, the gain-flatness can be maintained during varying operating conditions.

It is to be understood that the above-described embodiments are illustrative of only a few of the many possible specific embodiments which can represent applications of the principles of the invention. Numerous and varied other arrangements can be made by those skilled in the art without departing from the spirit and scope of the invention.

What is claimed:

1. An optical fiber grating reconfigurable in bandwidth comprising:

a length of optical fiber comprising a core and a cladding, said fiber including an optical grating region comprising a sequence of perturbations in the optical properties of the fiber, and said cladding characterized by an ambient index of refraction n having a temperature dependence dn/dT;

on the surface of said cladding or within said cladding a temperature sensitive material having an ambient index of refraction $n_t$ substantially equal to that of the cladding and an enhanced temperature dependence $dn_t/dT$ equal to or greater than 10 times the temperature dependence of the cladding; and disposed along said grating region one or more heating elements coupled to said temperature-sensitive material, said heating elements positioned for creating a temperature gradient in said temperature sensitive material along said gradient region.

2. The reconfigurable grating device of claim 1 wherein said heating elements comprise helical regions of resistive material.

3. The reconfigurable grating device of claim 1 wherein said grating region comprises a long period grating.

4. The reconfigurable grating device of claim 1 wherein said heating elements are spaced apart by an edge-to-edge separation in the range between 1 millimeter and 200 nanometers.

5. The reconfigurable grating device of claim 1 wherein the maximum lateral dimension of each heating element is in the range between 500 micrometers and 100 nanometers.

6. An optical amplifier comprising a rare-earth doped fiber and reconfigurable fiber grating according to claim 1.

7. An optical communication system comprising a transmitter, a trunk fiber, a receiver and one or more amplifiers according to claim 6.

* * * * *